United States Patent [19]

Hähnel

[11] 4,450,679

[45] May 29, 1984

[54] RAM JET ENGINES AND ROTARY GAS FLOW VALVE THEREFOR

[75] Inventor: Thomas Hähnel, Ottobrunn, Fed. Rep. of Germany

[73] Assignee: Messerschmitt-Bölkow-Blohm G.m.b.H., Fed. Rep. of Germany

[21] Appl. No.: 225,608

[22] Filed: Jan. 16, 1981

[30] Foreign Application Priority Data

Feb. 16, 1980 [DE] Fed. Rep. of Germany ....... 3005864

[51] Int. Cl.³ .................................................. F02K 7/10
[52] U.S. Cl. ..................... 60/251; 60/270.1; 137/625.31
[58] Field of Search ............ 60/245, 250, 254, 270 R, 60/270 S, 244, 270.1, 251; 137/625.31, 625.46; 222/484; 239/562, 569

[56] References Cited

U.S. PATENT DOCUMENTS

| | | | |
|---|---|---|---|
| 1,140,206 | 5/1915 | Swackhammer | 137/625.31 |
| 1,907,191 | 5/1933 | Thomas | 137/625.31 |
| 2,590,290 | 3/1952 | Chase | 137/625.31 |
| 2,912,820 | 11/1959 | Whitmore | 60/270 R |
| 2,948,112 | 8/1960 | Smith | 60/270 R |
| 3,712,058 | 1/1973 | Cooper | 60/254 |
| 4,075,832 | 2/1978 | Diesinger et al. | 60/245 |

FOREIGN PATENT DOCUMENTS 886639  1/1962  United Kingdom ........... 137/625.31

*Primary Examiner*—Carlton R. Croyle
*Assistant Examiner*—Timothy S. Thorpe
*Attorney, Agent, or Firm*—McGlew and Tuttle

[57] ABSTRACT

A device for controlling the flow cross sections of several channels for gas flow tubes which interconnect combustion chamber portions particularly of ram jet engines comprises a polygonal rotary valve which is rotatably mounted adjacent the passages and has corner portions which move through paths which cyclically cover and open these passages. The valve is actuated by a drive which includes a drive motor and shaft which are mounted in an insulation body between the combustion chamber portions.

3 Claims, 3 Drawing Figures

RAM JET ENGINES AND ROTARY GAS FLOW VALVE THEREFOR

FIELD AND BACKGROUND OF THE INVENTION

The invention relates in general to internal combustion engines and in particular to a new and useful device for controlling the flow cross-section of several channels disposed in circumferential direction, in particular on a sector, particularly for gas conduits of a rocket ram jet engine, through which the fuel-rich gases produced in a precombustion chamber flow into an after-combustion chamber.

Rotating flat valves are known in machine construction for various purposes. They involve cylindrical discs with orifices distributed over the circumference, by which the overflow channels are controlled. If complicated machines are involved, the manufacture and arrangement of such flat valves is relatively expensive.

SUMMARY OF THE INVENTION

The invention provides a rotary valve of simplest design for controlling individual overflow channels at minimum cost of manufacture, and which fulfills its function also under extreme operating conditions, in particular thermal influences.

According to the invention there is provided a polygonal rotary valve with a number of corners corresponding to the number of flow channels or gas conduits, the individual corners of which control the flow cross-sections of the individual flow channels or gas conduits.

A special form of construction according to the invention comprises a plate type rotary valve which is square and controls four gas conduits of a rocket ram jet engine.

To protect the drive of the rotary valve from heat damage in particular in rocket ram jet engines, it is further proposed in a development of the invention to arrange the drive of the centrally driven rotary valve centrally inside a heat insulation body.

The invention permits the use of simple and hence low-cost and light-weight structural parts as rotary valve, which can be mounted in an uncomplicated manner and in which expansion problems due to heat do not occur. The proposed rotary valve is therefore functionally safe even under extreme operating condutions. This is true also of its drive, which is lodged under heat insulation.

Accordingly, the invention provides a ram jet engine which comprises a housing having a precombustion chamber for the burning of a solid fuel to generate fuel-rich gases with an after combustion chamber in the housing and a plurality of gas flow condiuts interconnecting the two chambers and including a polygonal rotary valve which is rotatably mounted in the combustion chamber adjacent the passages and has corner portions which move through paths which cyclically cover and open the passages.

Accordingly, it is an object of the invention to provide an internal combustion engine having a plurality of combustion chamber portions with a plurality of passages for the passage of combustion gases from one portion to the other, the improvement which comprises a rotary valve which is rotatably mounted adjacent the passages and has corner portions which move through paths which cyclically cover and open the passages.

A further object of the invention is to provide a ram jet engine and a rotary valve device for an internal combustion engine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
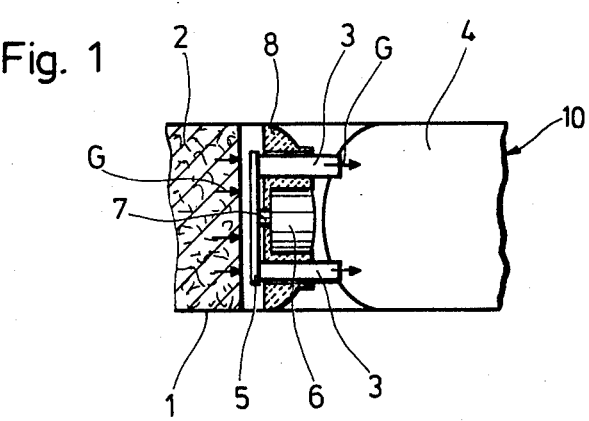
FIG. 1 is a partial section view of a rocket ram jet engine constructed in accordance with the invention.

Referring to the drawings in particular, the invention embodied therein, comprises a rotary valve device 5 for use in an internal combustion engine particularly a ram jet engine generally designated 10 having a precombustion chamber portion 1 and an after combustion chamber 4 with a plurality of separate gas conduits 3 interconnecting the precombustion chamber 1 with the after combustion chamber 4.

The precombustion chamber 1 of a rocket ram jet engine contains a solid fuel 2 which burns during cruising and in so doing produces fuel-rich gases G which flow via gas conduits 3 into an after-combustion chamber 4.

Figure 2:
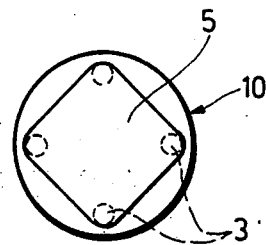
FIG. 2 is an end elevational view of the rotary valve for use in the engine shown in FIG. 1.
Figure 3:
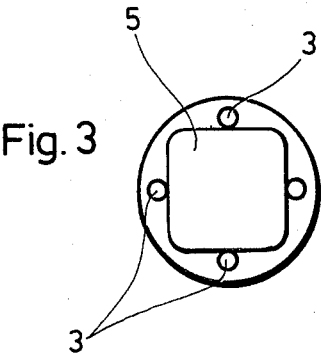
FIG. 3 is a view similar to FIG. 2 showing the valve in an open position.

The flow cross-sections of the individual gas conduits 3 are controlled by a plate type square rotary valve 5, i.e. each corner of the rotary valve 5 controls a gas conduit 3. FIG. 2 illustrates how the inlet cross-sections of the gas conduits 3 are closed by the rotary valve 5, while FIG. 3 shows the open position, i.e. the inlet openings of the gas conduits 3 cleared by valve 5.

The rotary valve 5 is driven by a centrally arranged drive motor 6 having a central shaft 7. The motor 6 and its shaft 7 are embedded in a heat-absorbing insulation body 8.

While a specific embodiment of the invention has been shown and described in detail to illustrate the application of the principles of the invention, it will be understood that the invention may be embodied otherwise without departing from such principles.

What is claimed is:

1. A ram jet engine comprising a housing having a precombustion chamber for the burning of solid fuel to generate fuel-rich gases, an after combustion chamber in said housing, a plurality of gas flow conduits connecting said precombustion chamber with said after combustion chamber and a polygonal rotary valve rotatably mounted in said housing adjacent said passage and having corner portions which move through paths which cyclically cover an open said passages, drive means connected to said rotary valve to rotate said valve, and a heat insulation body in said housing between said precombustion chamber and said after combustion chamber, said drive means comprising a drive motor having a rotatable shaft connected to said rotary valve and being mounted in said heat insulation body.

2. In an internal combustion engine having a plurality of combustion chambers and a plurality of passages for the passage of combustion gases from one chamber to the other, the improvement comprising a rotary polygonal valve, means for rotatably mounting said valve adjacent said passages, said valve having corner portions which move during rotation cyclically to cover and subsequently uncover said passages, drive means connected to said valve to rotate said valve, said drive means comprising a drive motor having a drive shaft, and a heat insulation member covering said motor and said shaft and providing a mounting for said valve.

3. In an internal combustion engine according to claim 2, the improvement wherein said polygonal valve is square and has four corner portions, said gas flow conduits comprising four gas conduits.

* * * * *